(12) United States Patent
Lee

(10) Patent No.: US 9,542,731 B2
(45) Date of Patent: Jan. 10, 2017

(54) APPARATUS FOR INCREASING SHARPNESS

(71) Applicant: LG INNOTEK CO., LTD., Seoul (KR)

(72) Inventor: Sang Yong Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/650,044

(22) PCT Filed: Dec. 4, 2013

(86) PCT No.: PCT/KR2013/011162
§ 371 (c)(1),
(2) Date: Jun. 5, 2015

(87) PCT Pub. No.: WO2014/088314
PCT Pub. Date: Jun. 12, 2014

(65) Prior Publication Data
US 2015/0302559 A1  Oct. 22, 2015

(30) Foreign Application Priority Data

Dec. 6, 2012 (KR) .......................... 10-2012-0140880

(51) Int. Cl.
*G06T 5/00* (2006.01)
*G06K 9/48* (2006.01)
*H04N 5/208* (2006.01)
*G06T 5/10* (2006.01)
*G06T 7/00* (2006.01)

(52) U.S. Cl.
CPC ................. *G06T 5/003* (2013.01); *G06K 9/48* (2013.01); *G06T 5/10* (2013.01); *G06T 7/0085* (2013.01); *H04N 5/208* (2013.01); *G06T 2207/20012* (2013.01); *G06T 2207/20192* (2013.01)

(58) Field of Classification Search
CPC .......... G06T 2207/20192; G06T 5/003; G06T 7/0085; G06T 7/408; G06T 2207/20201; G06T 5/002; G06T 3/4053; G06T 3/403; G06T 2207/20008; G06T 3/4007; G06T 7/0083; G06T 5/009; G06T 5/40; G06T 5/10; H04N 5/208; H04N 1/4092; H04N 19/154; H04N 19/172; H04N 1/62; H04N 5/142; H04N 1/401; H04N 1/409; H04N 5/57; G02B 7/36; A61B 1/00009; G06K 9/40; G01F 23/2921; G01F 23/2924; H01L 2933/0058; H01L 33/10; H01L 33/60; H01Q 3/24; H04L 25/03828; H04L 27/2602; H04L 27/2626
USPC ........ 382/167, 168, 199, 266, 274; 348/625, 348/252, 14
See application file for complete search history.

(56) References Cited

U.S. PATENT DOCUMENTS

| | | | |
|---|---|---|---|
| 7,230,742 B1 * | 6/2007 | Kuwata | G06T 3/4007 358/2.1 |
| 8,228,397 B2 * | 7/2012 | Katagiri | H04N 5/235 348/222.1 |
| 2003/0218776 A1 * | 11/2003 | Morimoto | G06T 7/0083 358/2.1 |

(Continued)

*Primary Examiner* — Vu Le
*Assistant Examiner* — Aklilu Woldemariam
(74) *Attorney, Agent, or Firm* — KED & Associates, LLP

(57) ABSTRACT

An apparatus for increasing sharpness is provided. The apparatus according to an exemplary embodiment of the present disclosure can improve sharpness of an image by applying different sharpness gains to a center of the image and to a periphery of the image.

9 Claims, 5 Drawing Sheets

(56) References Cited

U.S. PATENT DOCUMENTS

| | | | |
|---|---|---|---|
| 2004/0057630 A1* | 3/2004 | Schuhrke | H04N 1/4092 |
| | | | 382/254 |
| 2005/0025383 A1 | 2/2005 | Domingo et al. | |
| 2005/0104974 A1* | 5/2005 | Watanabe | H04N 1/6027 |
| | | | 348/222.1 |
| 2006/0061690 A1* | 3/2006 | De Haan | G06T 5/003 |
| | | | 348/625 |
| 2007/0098295 A1* | 5/2007 | Wu | H04N 5/783 |
| | | | 382/266 |
| 2008/0238820 A1* | 10/2008 | Enami | H04N 17/04 |
| | | | 345/55 |
| 2009/0067710 A1* | 3/2009 | Kang | G06T 5/003 |
| | | | 382/167 |
| 2009/0103831 A1* | 4/2009 | Nakamura | G06T 5/10 |
| | | | 382/274 |
| 2009/0115858 A1* | 5/2009 | Lee | G06T 7/2033 |
| | | | 348/208.4 |
| 2009/0278989 A1 | 11/2009 | Bae | |
| 2009/0316024 A1 | 12/2009 | Noh | |
| 2010/0182459 A1* | 7/2010 | Hwang | G06T 3/403 |
| | | | 348/240.99 |
| 2012/0007942 A1 | 1/2012 | Michrowski et al. | |
| 2012/0033885 A1 | 2/2012 | Ha et al. | |
| 2012/0105612 A1* | 5/2012 | Yoshino | A61B 1/00009 |
| | | | 348/65 |

* cited by examiner (a)      (b)      (c)      (d)

APPARATUS FOR INCREASING SHARPNESS

CROSS-REFERENCE TO RELATED PATENT APPLICATIONS

This application is a U.S. National Stage Application under 35 U.S.C. §371 of PCT Application No. PCT/KR2013/011162, filed Dec. 4, 2013, which claims priority to Korean Patent Application No. 10-2012-0140880, filed Dec. 6, 2012, whose entire disclosures are hereby incorporated by reference.

TECHNICAL FIELD

The teachings in accordance with the exemplary embodiments of this present disclosure generally relate to an apparatus for increasing sharpness of an image.

BACKGROUND ART

Generally, an image process system goes through a process of correcting a distorted image because a distortion exists on an image obtained through an image sensor. At this time, there is a problem of emphasizing a noise component at the same time by emphasizing sharpness of an image center in the course of increasing sharpness at a periphery of an image, whereby noise of the image center is emphasized while a screen becomes fuzzy or awkward due to excessively improved sharpness.

DISCLOSURE

Technical Problem

It is an object of the present disclosure to provide an apparatus for increasing sharpness by applying a different sharpness gain to a center of an image and a periphery of the image.

Technical Solution

In order to achieve at least the above object, in whole or in part, and in accordance with the purposes of the disclosure, as embodied and broadly described, and in one general aspect of the present disclosure, there may be provided an apparatus for increasing sharpness, the apparatus comprising: a sensor unit configured to obtain an image; a detection unit configured to detect an edge component of the image; and a synthesize unit configured to synthesize different sharpness gains according to a position of the image to an edge component detected by the detection unit.

In some exemplary of the present invention, the apparatus may further comprise an output unit configured to output a final image using an edge component improved in sharpness by the synthesize unit.

In some exemplary of the present invention, the synthesize unit may be configured to synthesize a smallest sharpness gain toward a center of the image.

In some exemplary of the present invention, the synthesize unit may be configured to synthesize a larger sharpness gain toward a periphery of the image.

In some exemplary of the present invention, the synthesize unit may be configured to synthesize a sharpness gain discretely increasing from a center of the image toward a periphery of the image.

In some exemplary of the present invention, the synthesize unit may be configured to synthesize a sharpness gain continuously increasing from a center of the image toward a periphery of the image.

In some exemplary of the present invention, the synthesize unit may be configured to synthesize a Laplacian type sharpness gain to the image.

In another general aspect of the present disclosure, there may be provided an apparatus for increasing sharpness, the apparatus comprising: a sensor unit configured to obtain an image; a detection unit configured to detect an edge component of the image; a filter unit configured to divide the edge component to a plurality of frequency bands; a plurality of first synthesize units configured to synthesize respectively different sharpness gains to the edge components extracted to the plurality of frequency bands; and a plurality of second synthesize units configured to synthesize the edge components outputted by the plurality of synthesizers.

In some exemplary of the present invention, the apparatus may further comprise an output unit configured to output a final image using an edge component improved in sharpness by the synthesize unit.

In some exemplary of the present invention, the filter unit may include a plurality of BPFs (Band Pass Filters) each passing a respectively different frequency band.

In some exemplary of the present invention, the first synthesizer may be configured to synthesize a Laplacian type sharpness gain to the image.

Advantageous Effects

As apparent from the foregoing, the apparatus for increasing sharpness according to an exemplary embodiment of the present disclosure can synthesize larger sharpness gains toward a periphery of an image compared to sharpness gains toward a center of an image to restrict generation of noise and to restrict an excessive increase in sharpness toward a center of an image as well.

Furthermore, edge components of an image can be divided into each frequency band, and respective sharpness gains can be synthesized according to relevant frequency bands to reduce generation of noise, and to increase sharpness for each frequency band of edge components.

BEST MODE

Figure 1:
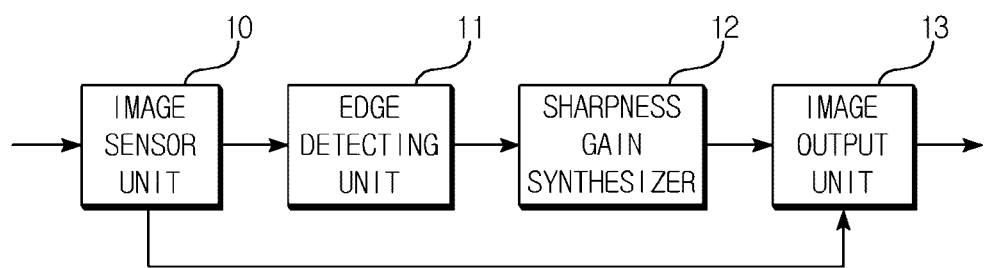
FIG. 1 is a schematic block diagram illustrating an apparatus for increasing sharpness according to a first exemplary embodiment of the present invention.

While the present disclosure is susceptible to various modifications and alternative forms, certain implementations are shown by way of example in the drawings and, these implementations will be described in detail herein. It will be understood, however, that this disclosed concept is not intended to limit the disclosure to the particular forms described, but to the contrary, the disclosure is intended to cover all modifications, alternatives, and equivalents falling within the spirit and scope of the concept defined by the appended claims.

Hereinafter, exemplary embodiment of the present disclosure will be described in detail with reference to the accompanying drawings.

Figure 2A:
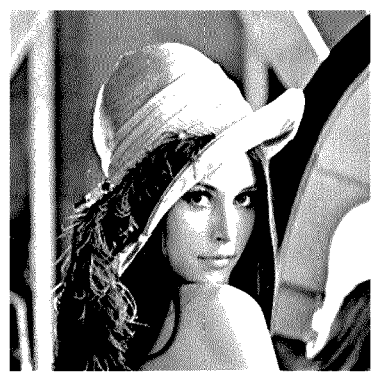
FIGS. 2a to 2c are schematic views illustrating an image outputted from each constituent element of FIG. 1 according to an exemplary embodiment of the present invention.
Figure 2B:
Figure 2C:
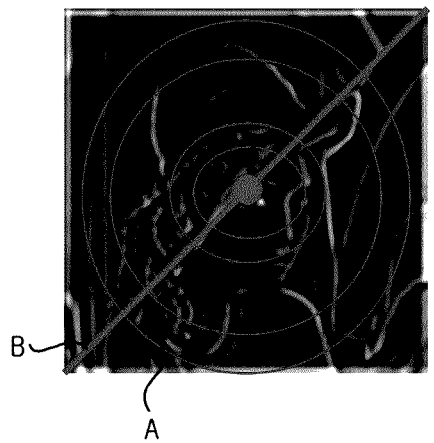

FIG. 1 is a schematic block diagram illustrating an apparatus for increasing sharpness according to a first exemplary embodiment of the present invention, and FIGS. 2a to 2c are schematic views illustrating an image outputted from each constituent element of FIG. 1 according to an exemplary embodiment of the present invention.

Referring to FIG. 1, the apparatus for increasing sharpness (hereinafter referred to as "apparatus") according to a first exemplary embodiment of the present invention comprises an image sensor (10), an edge detection unit (11), a sharpness gain synthesize unit (12) and an image output unit (13).

The image sensor (10) obtains an image signal received from a camera (not shown) configured to photograph an image. The image sensor (10) may be a camera sensor of a CCD (Charge Coupled Device) type or a CMOS (Complementary Metal Oxide Semiconductor) type camera sensor, for example. However, the present disclosure is not limited thereto, and other devices capable of performing a function similar to the camera sensor may be also used. FIG. 2a illustrates an image obtained by the image sensor (10).

The edge detection unit (11) detects an edge component of the image obtained by the image sensor (10). For example, when the image sensor (10) outputs RGB (red, green, blue) images, the edge detection unit (11) may detect a brightness (luminance) component (Y) from the RGB images, where the brightness component may be an edge component. Methods converting RGB components to YCbCr components are well known in the technical field the present disclosure belongs to, such that no further detailed explanation is provided therein. FIG. 2b illustrates an edge detected from the image of FIG. 2a by the edge detection unit (11).

Figure 3:
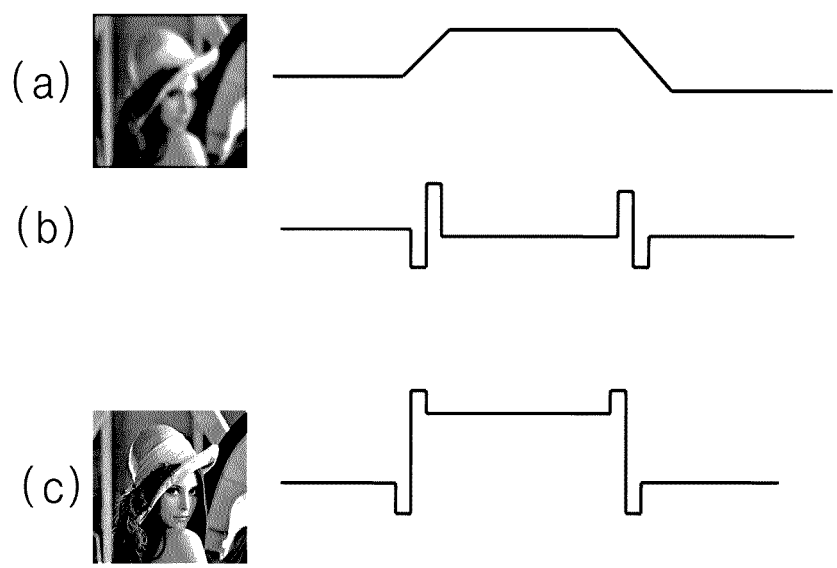
FIG. 3 is a schematic view illustrating a method of synthesizing, by a sharpness gain synthesize unit, a sharpness gain relative to an edge according to an exemplary embodiment of the present invention.

The sharpness gain synthesize unit (12) synthesizes sharpness gains of edges detected by the edge detection unit (11). FIG. 3 is a schematic view illustrating a method of synthesizing, by the sharpness gain synthesize unit (12), a sharpness gain of an edge according to an exemplary embodiment of the present invention, where (a) expresses an edge detected by the edge detection unit (12), (b) illustrates a sharpness gain, and (c) illustrates a synthesized result of (a) and (b). It can be noted from FIG. 3 that edge of an image is further sharpened by synthesize of sharpness gains.

The sharpness gain synthesize unit (12) according to an exemplary embodiment of the present disclosure may differently synthesize the sharpness gains in response to positions of the images. That is, the sharpness gain synthesize unit (12) may divide an image to a plurality of concentric circles (A), as shown in FIG. 2c, and provide a separate sharpness gain to each edge of the image inside the concentric circles, whereby respectively different sharpness gains can be provided in response to positions of the image. To be more specific, smallest sharpness gains may be synthesized for a center of the image and largest sharpness gains may be synthesized for a periphery of the image.

Sharpness gains, which discretely increase from a center of an image or which continuously increase from a center of an image, can be synthesized using the sharpness gain synthesize unit (12) according to an exemplary embodiment of the present disclosure that provides a separate gain to each concentric circle to the image as shown in FIG. 2c.

Figure 4A:
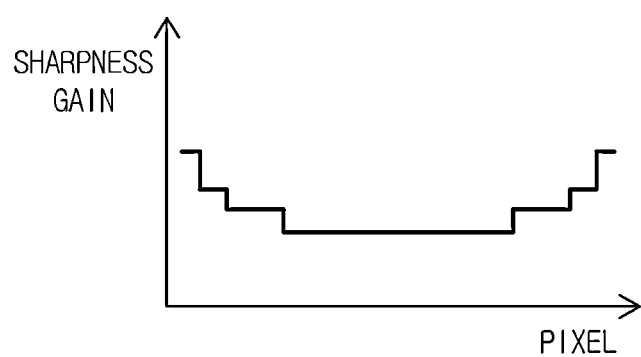
FIGS. 4a and 4b are schematic views illustrating sharpness gains discretely and continuously increasing from a center of an image.
Figure 4B:
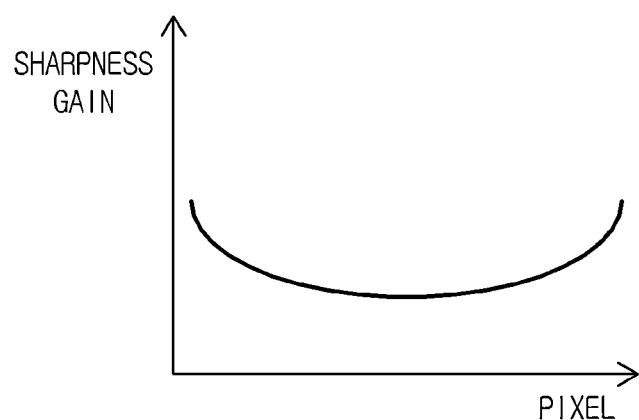

FIGS. 4a and 4b are schematic views illustrating sharpness gains discretely and continuously increasing from a center of an image, where a gain set along a diagonal line (B) of FIG. 2c is illustrated, for example. Referring to FIGS. 4a and 4b, it can be noted that smallest sharpness gains are provided toward the center of the image for both FIGS. 4a and 4b, and largest sharpness gains are provided toward the periphery of the image.

The image output unit (13) may output a final image using edge components improved in sharpness. That is, the sharpness-improved edge image is a brightness component, and RGB images can be outputted using the brightness component. The conversion of brightness image to RGB images is well known to the skilled in the art, such that no further explanation thereto is made.

The sharpness gain synthesize unit (12) according to an exemplary embodiment of the present disclosure may use a Laplacian type sharpness gain. Generally, a Laplacian mask is used for detecting an edge of an image, which can be expressed by the following Equation 1.

$$G^2 f = [f(x+1,y) + f(x-1,y) + f(x,y+1) + f(x,y-1)]$$ [Math FIG. 1]

A gain may be expressed by the following Equation when using a Laplacian mask.

$$g(x, y) = \begin{cases} f(x, y) - G^2 f(x, y) \\ f(x, y) + G^2 f(x, y) \end{cases}$$ [Math Figure 2]

A center constant of the Laplacian mask is negative for an upper case of the above Equation 2, and positive for a lower case of the above Equation 2.

The sharpness gain synthesize unit (12) according to an exemplary embodiment of the present disclosure has an original image at a center of an image and has a result as expressed in Equation 2 toward a periphery of an image. A gain using the Laplacian used by the sharpness gain synthesize unit (12) according to an exemplary embodiment of the present disclosure may be expressed by the following Equation 3.

$$g(x, y) = f(x, y) - G^2 f(x, y) S \frac{\sqrt{x^2 + y^2}}{r}$$ [Math Figure 3]

where, 'r' is a distance from a center of an image to an outmost area, and (x, y) are a coordinate of a point moved from a center of an image. However, the above explanations are just examples, and the sharpness gain synthesize unit (12) according to an exemplary embodiment of the present disclosure can provide sharpness gains relative to an edge detected by other methods.

The apparatus for increasing sharpness according to an exemplary embodiment of the present disclosure can synthesize larger sharpness gains toward a periphery of an image compared to sharpness gains toward a center of an image to restrict generation of noise and to restrict an excessive increase in sharpness toward a center of an image as well.

MODE FOR INVENTION

Figure 5:
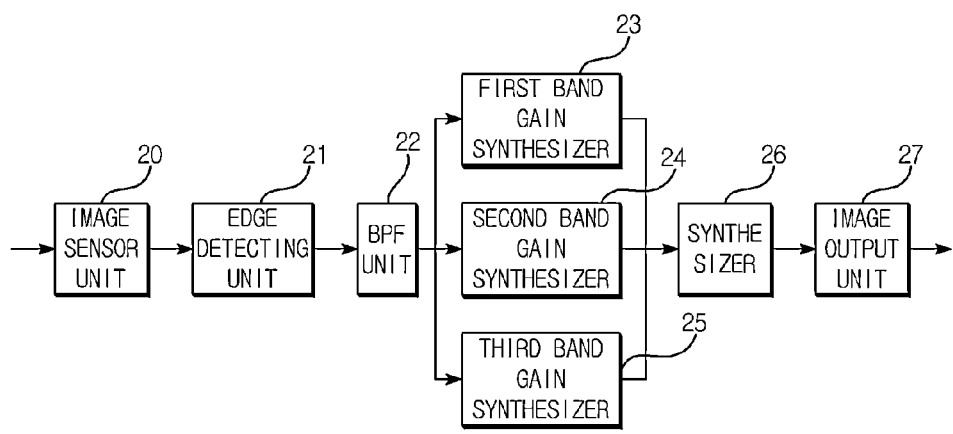
FIG. 5 is a schematic block diagram illustrating an apparatus for increasing sharpness according to a second exemplary embodiment of the present invention.

FIG. 5 is a schematic block diagram illustrating an apparatus for increasing sharpness according to a second exemplary embodiment of the present invention.

Referring to FIG. 5, the apparatus for increasing sharpness according to a second exemplary embodiment of the present invention may include an image sensor unit (20), an edge detection unit (21), a BPF (Band Pass Filter, 22), first, second and third band gain synthesize units (23, 24, 25), a synthesize unit (26) and an image output unit (27).

The image sensor (20) obtains an image signal received from a camera (not shown) configured to photograph an image. The image sensor (20) may be a camera sensor of a CCD type or a CMOS type camera sensor, for example. However, the present disclosure is not limited thereto, and other devices capable of performing a function similar to the camera sensor may be also used.

The edge detection unit (21) detects an edge component of the image obtained by the image sensor (20). For example, when the image sensor (20) outputs RGB (red, green, blue) images, the edge detection unit (21) may detect a brightness (luminance) component (Y) from the RGB images, where the brightness component may be an edge component. Methods converting RGB components to YCbCr components are well known in the technical field the present disclosure belongs to, such that no further detailed explanation is provided therein.

The BPF unit (22) may extract a particular frequency band from an edge of an image detected by the edge detection unit (21). That is, the BPF unit (22) may separate from the edge of the image to a high band edge component, a middle band edge component and a low band edge component. Although the apparatus for increasing sharpness according to the second exemplary embodiment of the present invention illustrates using one BFP, it would be obvious that a plurality of BPFs may form a BPF unit.

Furthermore, a high band, a middle band and a low band are determined by attributes of an image, which are a relative concept, such that the present disclosure is not restricted to particular bands.

Although the following exemplary embodiment of the present disclosure describes a case with three BPF units (22), it would be obvious to the skilled in the art that the present disclosure is not limited thereto.

The first, second and third band gain synthesize units (23, 24, 25) synthesize edge images of particular band received from the BFP unit (22) by respectively providing a sharpness gain thereto.

That is, an edge detected by the edge detection unit (21) is classified to predetermined frequency bands, and separate sharpness gains are synthesized on edge components of particular frequency bands according to an exemplary embodiment of the present disclosure, whereby sharpness for each predetermined frequency band can be increased and noise can be reduced.

Figure 6:
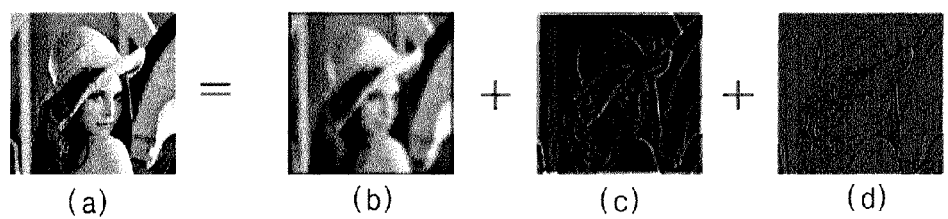
FIG. 6 is a schematic view illustrating an edge component for each frequency band.

FIG. 6 is a schematic view illustrating an edge component for each frequency band, where (a) is an edge component of an image detected by the edge detection unit (21), and (b) (c) and (d) are edge components separated by the BPF unit (22) for each band.

The exemplary embodiment of the present disclosure can individually extract a frequency band for each image by checking a frequency band of an edge component in an image. Thus, a frequency band may be determined by an image.

The synthesize unit (26) can synthesize edge components of an image in which sharpness gains are respectively synthesized for each band, and the image output unit (27) can output final RGB images by using a sharpness-increased edge component.

The apparatus for increasing sharpness according to a second exemplary embodiment of the present disclosure divides an edge component to each frequency band, and applies a separate sharpness gain to each band.

A gain equation used by the first, second and third band gain synthesize units (23, 24, 25) may be expressed by the following Equation, when the apparatus for increasing sharpness according to the second exemplary embodiment of the present disclosure uses the Laplacian.

$$g(x, y) = G_n(x, y) + \sum_{i=1}^{n} L_{i-1}(x, y) - \alpha G^2 \left( G_n(x, y) + \sum_{i=1}^{n} \beta_{i-1} L_{i-1}(x, y) \right) \frac{\sqrt{x^2 + y^2}}{r}$$ [Math Figure 4]

where, 'r' is a distance from a center of an image to an outmost area, and (x, y) are a coordinate of a point moved from a center of an image. $G_i$ is an image, where an original image 'f' is applied with ith Gaussian, indicates information on low frequency band, and may be defined by the following equation.

$$G_i = G(G_{i-1}, \sigma_i)$$ [Math FIG. 5]

where, $G_0$ defines an original image 'f', and 'σ' is a constant that affects division of band area.

Furthermore, $L_{i-1}$ in Equation 4, which is an image removed of $G_i$ from $G_{i-1}$, indicates information on high frequency band, 'α' is a constant indicating an improved level of an entire sharpness, and $\beta_i$ is a constant indicating a weight for each band, which may be provided by a user selection. Thus, Equation 4 may be expressed by the following equation if an edge is divided to three bands as in the second exemplary embodiment of the present disclosure.

$$g(x, y) = G_2(x, y) + L_0(x, y) + L_1(x, y) - \alpha G^2(G_2(x, y) + \beta_0 L_0(x, y) + \beta_1 L_1(x, y)) \frac{\sqrt{x^2 + y^2}}{r}$$ [Math Figure 6]

where, 'α' is an improved level of an entire sharpness, where, an image appears as if the image has not improved if 'α' is too small, and the high frequency components of edge components or noise components may be highlighted if 'α' is too large. Furthermore, β is a constant indicating a weight for each band. For example, $\beta_1$ indicates a gain for a middle frequency band, if a gain of low band is defined as 1 according to the exemplary embodiment of the present disclosure, $\beta_2$ is a gain of a high frequency band, if a gain of low band is defined as 1. If β<1, edge components or noise components in high frequency components are prevented from being highlighted, and if β>1, the edge components or noise components in high frequency components are rather amplified. Thus, appropriate selection of α and β is required depending on images.

However, the above cases are limited to those using the Laplacian, and the apparatus for increasing sharpness according to an exemplary embodiment of the present disclosure may synthesize gains with edge components of an image using other methods than the Laplacian.

The apparatus for increasing sharpness according to an exemplary embodiment of the present disclosure can divide edge components of an image to each frequency band, and synthesize each separate sharpness gain according to a relevant frequency band to reduce generation of noise and increase sharpness of each frequency band.

As apparent from the foregoing, the apparatus for increasing sharpness according to an exemplary embodiment of the present disclosure can synthesize larger sharpness gains toward a periphery of an image compared to sharpness gains toward a center of an image to restrict generation of noise and to restrict an excessive increase in sharpness toward a center of an image as well.

Furthermore, edge components of an image can be divided into each frequency band, and respective sharpness gains can be synthesized according to relevant frequency bands to reduce generation of noise, and to increase sharpness for each frequency band of edge components.

The previous description of the present disclosure is provided to enable any person skilled in the art to make or use the inventive disclosure. Various modifications to the disclosure will be readily apparent to those skilled in the art, and the generic principles defined herein may be applied to other variations without departing from the spirit or scope of the disclosure. Thus, the present disclosure is not intended to limit the examples described herein, but is to be accorded the widest scope consistent with the principles and novel features disclosed herein.

The invention claimed is:

1. An apparatus for increasing sharpness, the apparatus comprising:
    a sensor unit configured to obtain an image;
    a detection unit configured to detect an edge component of the image; and
    a synthesize unit configured to synthesize sharpness gains differently in response to an image position of an edge component detected by the detection unit,
    wherein the synthesize unit is configured to synthesize a smallest sharpness gain toward an edge component in a center of the image and synthesize a larger sharpness gain toward an edge component in a periphery of the image to restrict generation of noise and to restrict an excessive increase in sharpness toward the center of the image.

2. The apparatus of claim 1, further comprising:
    an output unit configured to output a final image using an edge component improved in sharpness by the synthesize unit.

3. The apparatus of claim 1, wherein the synthesize unit is configured to synthesize a sharpness gain discretely increasing from a center of the image toward a periphery of the image.

4. The apparatus of claim 1, wherein the synthesize unit is configured to synthesize a sharpness gain continuously increasing from a center of the image toward a periphery of the image.

5. The apparatus of claim 1, wherein the synthesize unit is configured to synthesize a Laplacian type sharpness gain to the image.

6. An apparatus for increasing sharpness, the apparatus comprising:
    a sensor unit configured to obtain an image;
    a detection unit configured to detect an edge component of the image;
    a filter unit configured to divide the edge component to a plurality of frequency bands;
    a plurality of first synthesize units configured to synthesize respectively different sharpness gains to the edge components extracted to the plurality of frequency bands; and
    a second synthesize unit configured to synthesize the edge components outputted by the plurality of first synthesize units,
    wherein the second synthesize unit is configured to synthesize each separate sharpness gain according to a relevant frequency band to reduce generation of noise and increase sharpness of each frequency band.

7. The apparatus of claim 6, further comprising:
    an output unit configured to output a final image using an edge component improved in sharpness by the synthesize unit.

8. The apparatus of claim 6, wherein the filter unit includes a plurality of BPFs (Band Pass Filters) each passing a respectively different frequency band.

9. The apparatus of claim 6, wherein the first synthesizer is configured to synthesize a Laplacian type sharpness gain to the image.

* * * * *